United States Patent [19]

Danieau

[11] Patent Number: 5,931,733
[45] Date of Patent: Aug. 3, 1999

[54] AIR FLOW CONTROL DEVICE, IN PARTICULAR FOR A HEATING AND/OR AIR CONDITIONING INSTALLATION FOR A MOTOR VEHICLE

[75] Inventor: Jacques Danieau, Noisy Le Roi, France

[73] Assignee: Valeo Climatisation, La Verriere, France

[21] Appl. No.: 08/824,162

[22] Filed: Mar. 26, 1997

[30] Foreign Application Priority Data

Mar. 29, 1996 [FR] France .................................. 96 04007

[51] Int. Cl.$^6$ ....................................................... B60H 1/24
[52] U.S. Cl. ............................. 454/69; 251/901; 454/156
[58] Field of Search .............................. 454/69, 121, 126, 454/156, 159, 160, 161; 251/129.11, 326, 901

[56] References Cited

U.S. PATENT DOCUMENTS

| 2,989,076 | 6/1961 | Rohmann | 251/901 X |
|---|---|---|---|
| 5,105,730 | 4/1992 | Smith | 454/161 |
| 5,243,830 | 9/1993 | Ito et al. | 251/901 X |

FOREIGN PATENT DOCUMENTS

| 0 459 473 | 12/1991 | European Pat. Off. . |  |
|---|---|---|---|
| 2 580 791 | 10/1986 | France . |  |
| 38 20 525 | 12/1989 | Germany . |  |
| 211981 | 5/1968 | U.S.S.R. | 251/901 |

OTHER PUBLICATIONS

French Search Report dated Jan. 1, 1997.

*Primary Examiner*—Harold Joyce
*Attorney, Agent, or Firm*—Morgan & Finnegan, LLP

[57] ABSTRACT

An air flow control device is of the film obturator type, and is in the form of an independent module comprising a support frame on which two rollers are mounted for rotation. A film or blind, having open regions and closed regions for selectively controlling the flow of a stream of air, is wound on the rollers. The support frame comprises a guide frame which lies between the two rollers, for guiding the film and for contact with the film; and a press frame is arranged in facing relationship with the guide frame. The press frame carries springs for pressing the film against the guide frame.

16 Claims, 2 Drawing Sheets

AIR FLOW CONTROL DEVICE, IN PARTICULAR FOR A HEATING AND/OR AIR CONDITIONING INSTALLATION FOR A MOTOR VEHICLE

FIELD OF THE INVENTION

This invention relates to flow control devices for controlling the flow of a stream of air through an air passage aperture. In particular, though without limitation, the invention relates to such flow control devices for incorporation in heating and/or air conditioning installations for motor vehicles.

BACKGROUND OF THE INVENTION

In installations of this kind, it is necessary to provide at least one flow control device for controlling a stream of air through an air passage aperture. This stream of air may be fresh air, heated air, or conditioned air. The air passage aperture may be an inlet or outlet opening defined by, for example, a duct, a distribution port, or other part of the heating or air conditioning installation.

Conventional flow control devices used in these situations generally consist of pivoting flap valves, especially of the curtain or butterfly type, which can be driven in rotation either manually or by means of a motorized actuator. These flap type flow control devices have the major disadvantage that they require a large amount of space in order to permit the valve member (i.e. the flap) to be displaced. This increases the overall size of the heating and/or air conditioning installation. In addition, they give rise to a considerable resistance to the air flow, and this in turn means that quite powerful motorized actuators must be used.

It is known in addition, in particular from French patent specification No. FR 2 580 791 A, to make use of a flow control device of the type comprising a film, in the form of a flexible blind or curtain, which is rolled on two rollers which are spaced apart from each other. The film is arranged to be disposed across the air passage aperture through which the flow of air is to be controlled. To this end, the film is formed with open regions and closed regions, so that the air flow is controlled selectively by moving the film between different positions in relation to the aperture. Thus, the film can be displaced either in one direction or in the opposite direction by winding it on to one of the rollers and unwinding it at the same time from the other roller.

Known devices of this type, also referred to as film obturators, do however have the disadvantage that they are of somewhat complex structure; and they require particular adaptation of the casing of the heating or air conditioning installation as a whole, in order that the flow control device can be fitted within this casing. As a result, the structure of the casing of the installation has to be somewhat complex. In addition, it should be noted that these film obturators of known types have to be designed specially for each design of heating or air conditioning installation. Moreover, these known types of device involve lengthy and costly fitting operations.

One problem which is encountered in flow control devices of the film obturator type is to ensure good integrity of the film in the zone normally referred to as the diffusion zone. This is the zone in which the stream of air meets the film. In this connection, the film itself is a flexible element which is formed generally of textile and plastics materials, and the holes through the film that define the above mentioned open regions may be quite large: this in turn affects the strength of the film and its stiffness, i.e. its resistance to unwanted deformation. If the film is not strong enough or rigid enough, it can tend to become creased or wavy, and this is detrimental to proper functioning of the flow control device. It can also lead to vibrations or even noise, and can sometimes also lead to the film becoming jammed. In order to overcome this disadvantage, known devices of the film obturator type include film tensioning means, such as mechanical tensioners with strings and pulleys. However, these mechanisms are complex, and involve delicate adjustment.

DISCUSSION OF THE INVENTION

A main object of the invention is to provide an air flow control device which is generally of the film obturator type, but in which the above drawbacks are overcome.

According to the invention, an air flow control device, for controlling the flow of a stream of air through an air passage aperture, in particular for a heating and/or air conditioning installation for a motor vehicle, the control device being of the type comprising a film wound on two rollers spaced apart from each other, the device being arranged to be disposed with the film extending across the air passage aperture, the film having open regions and closed regions for selectively controlling the flow of air through the said aperture according to the position of the film relative to the aperture, is characterised in that the flow control device is in the form of an independent module comprising a support frame on which the two rollers are mounted for rotation about parallel axes, the support frame including a guide frame disposed between the two rollers for guiding and contact with the film, and in that the device further includes a press frame disposed in facing relationship with the guide frame and carrying spring means for applying the film flat against the guide frame.

Thus, the flow control device in accordance with the invention is in the form of a module or cassette, in which the required resistance of the film to unwanted deformation is ensured by cooperation between the guide frame, the press frame, and the spring means. In this connection, the film is held closely against the guide frame by the spring means carried by the press frame, and this prevents the formation of creases or waves in the film when a stream of air is impingeing on, and/or passing through, the film.

In addition, the module can easily be fitted into a heating and/or air conditioning installation for a motor vehicle. The outer casing of the installation itself simply needs to have a housing, arranged in advance to receive the module in a position such that the window defined by the various frames of the flow control device lies across the air passage aperture through which the flow of air is to be controlled. The module can thus be fitted without any special tooling being necessary. Moreover, a single design of module can be arranged for equipping different designs of heating units and/or air conditioning units, so that module design can be standardized.

The module thus represents a component which is completely independent of the design of the installation in which it is to be fitted. Thus, the module can exercise by itself the function of controlling the flow of the stream of air, by opening and closing the air passage aperture in which it is fitted, under closely controlled conditions.

The guide frame preferably comprises a generally rectangular, flat peripheral frame member with two longitudinal side portions extending at right angles to the axes of the said rollers, together with two transverse side portions extending parallel to the said axes.

Preferably, each of the transverse side portions of the peripheral frame member has an entry chamfer facilitating to-and-fro displacement of the film.

In order to improve the resistance of the film to unwanted deformation, the guide frame further has a central bridge portion connecting together its two transverse side portions.

According to a preferred feature of the invention, the guide frame carries ribs for supporting the film.

According to another preferred feature of the invention, the press frame is of homologous form to the guide frame and comprises two longitudinal side members and two transverse side members. Thus, and preferably, the press frame further includes a central bridge portion joining together its two transverse side portions and arranged to be disposed in facing relationship with the central bridge portion of the guide frame.

In this specification, the expression "spring means" is to be understood to mean any component or device which is capable of exerting an elastic pressure on the film so as to urge it against the guide frame.

Preferably, the spring means comprise leaf springs carried by the press frame, with each said leaf spring extending in a direction which is transverse to the axes of rotation of the said rollers.

In preferred embodiments of the invention, the flow control device has three leaf springs, namely two springs disposed in facing relationship with the longitudinal side portions of the guide frame, and a spring disposed in facing relationship with the central bridge portion of the guide frame. The leaf springs are preferably of metal, and are preferably secured by means of rivets to the press frame.

The press frame preferably includes clipping lugs for fastening it to the support frame.

According to a further preferred feature of the invention, the press frame includes, on the side thereof facing away from the film, a connecting skirt portion for fitting the flow control device in a said air passage aperture.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
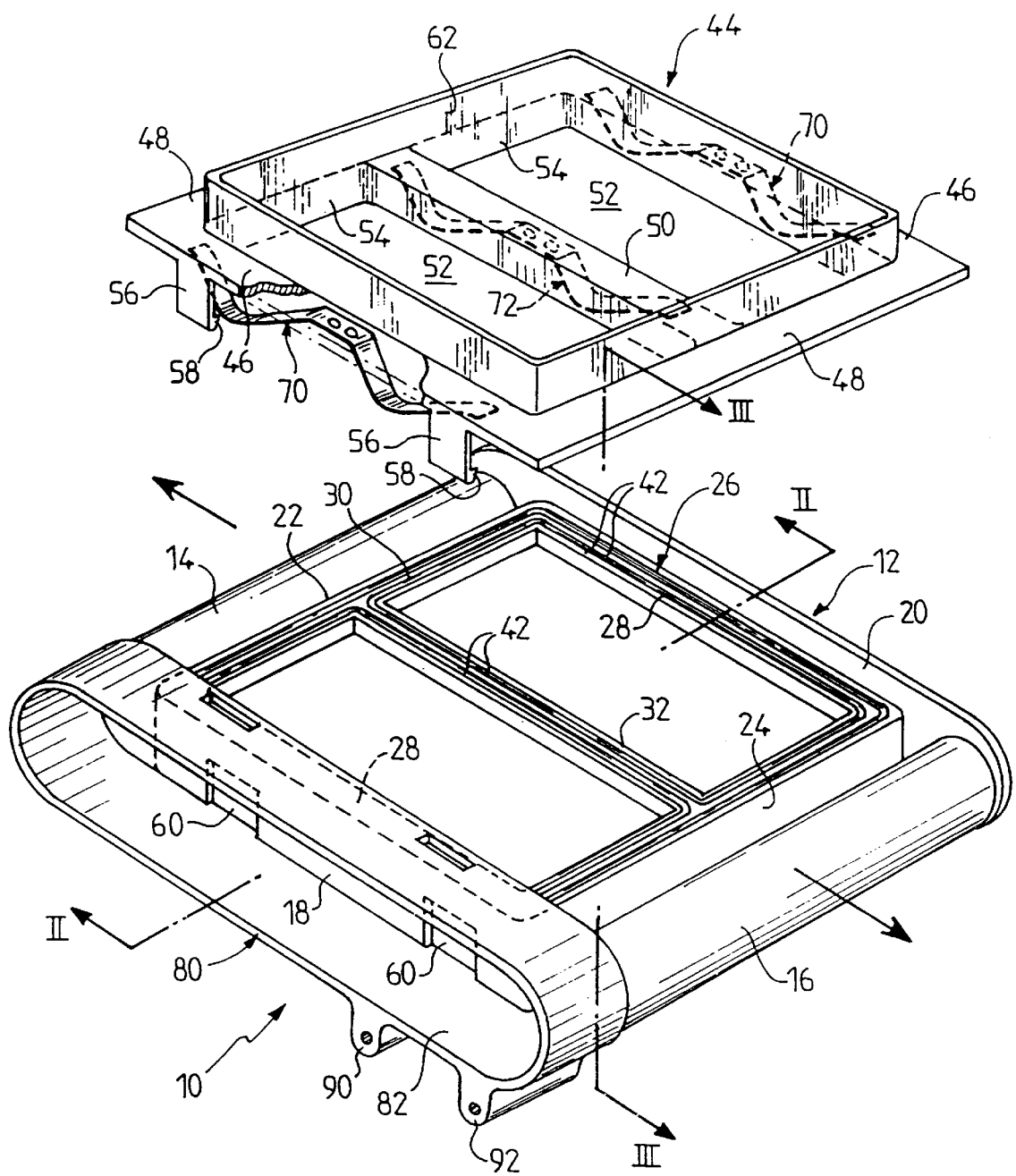
FIG. 1 is an exploded perspective view showing part of an air flow control device in accordance with the invention.
Figure 3:
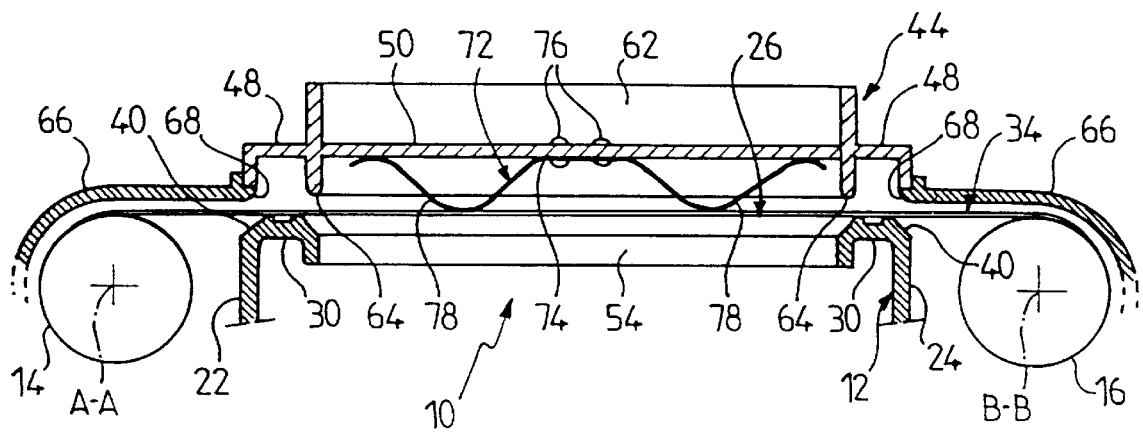
FIG. 3 is a view in cross section taken on the line III—III in FIG. 2.

The air flow control device shown in FIG. 1 is in the form of an independent module 10 constituting a cassette. It comprises a support frame 12 which carries two rollers 14 and 16. These rollers are mounted on the support frame 12 for rotation about axes A—A and B—B respectively, these axes being parallel to each other as can be seen in FIG. 3. The support frame 12, which is preferably made of a suitable plastics material, comprises two opposed side plates 18 and 20 having an elongate configuration and extending parallel to each other. The axis of each of the rollers 14 and 16 extends through the side plates 18 and 20, close to the ends of the latter.

The side plates 18 and 20 are joined together by means of two cross members 22 and 24 which are parallel to each other and disposed close to the rollers 14 and 16 respectively. A guide frame 26 is formed between the side plates 18 and 20 and the cross members 22 and 24. The guide frame 26 lies in a plane parallel to the plane that contains the axes A—A and B—B. The guide frame 26 has a generally rectangular flat peripheral edge, with two longitudinal side portions 28 which extend at right angles to the axes A—A and B—B of the rollers, together with two transverse side portions 30 which extend parallel to the axes A—A and B—B. The longitudinal side portions 28 extend along the side plates 18 and 20 of the frame 12, and the transverse side portions 30 extend along its cross members 22 and 24. In addition, the guide frame 26 includes a central bridge 32 which joins the two transverse side portions 30 together, and which lies halfway between the two longitudinal side portions 28. The central bridge 32 is coplanar with the side portions 28 and 30 of the guide frame.

The guide frame 26 serves for contact and guiding of a film 34 (shown in FIGS. 2 and 3 but not in FIG. 1), which is made in the form of a rectangular flexible band constituting a blind or curtain. The blind 34 is formed with apertures 36, FIG. 2 which constitute open regions of the blind, so that the remainder of the blind consists of closed regions 38 indicated in FIG. 2. The width of the blind corresponds to the space defined between the two side plates 18 and 20, and the blind is fitted at its ends in appropriate longitudinal slots (not shown) which are formed in the rollers 14 and 16. The blind 34 is thus able to be displaced along the guide frame 26 in either one direction or the other as required, by winding it on to one of the rollers while unwinding it from the other, and vice versa.

In the guide frame 26, each of its transverse side portions 30 is formed with an entry chamfer 40, shown in FIG. 3, which facilitates this alternate displacement of the film 38. In addition, the longitudinal side portions 28, the transverse side portions 30 and the central bridge 32, which together constitute the guide frame 26, are formed with ribs 42. In this example, these ribs are in the form of double ribs, each of which has a substantially triangular right cross section, with a view to minimizing friction between the guide frame 26 and the film blind 34.

The air flow control device 10 also includes a press frame 44 which is adapted to be secured to the support frame 12 in facing relationship with the guide frame 26. The press frame 44 has a form which matches that of the guide frame 26. Accordingly, it has two longitudinal side portions 46 and two transverse side portions 48, which constitute a flat frame and which are arranged to be disposed in facing relationship with the longitudinal side portions 28 and transverse side portions 30, respectively, of the guide frame 26. In addition, the press frame 44 has a central bridge 50 which lies halfway between the two longitudinal side portions 46 and which therefore overlies the central bridge 32 of the guide Frame 26. The press frame 44 thus defines two rectangular openings 52, each of which is surrounded by a peripheral flange 54 which projects at right angles to the general plane of the press frame 44.

Figure 2:
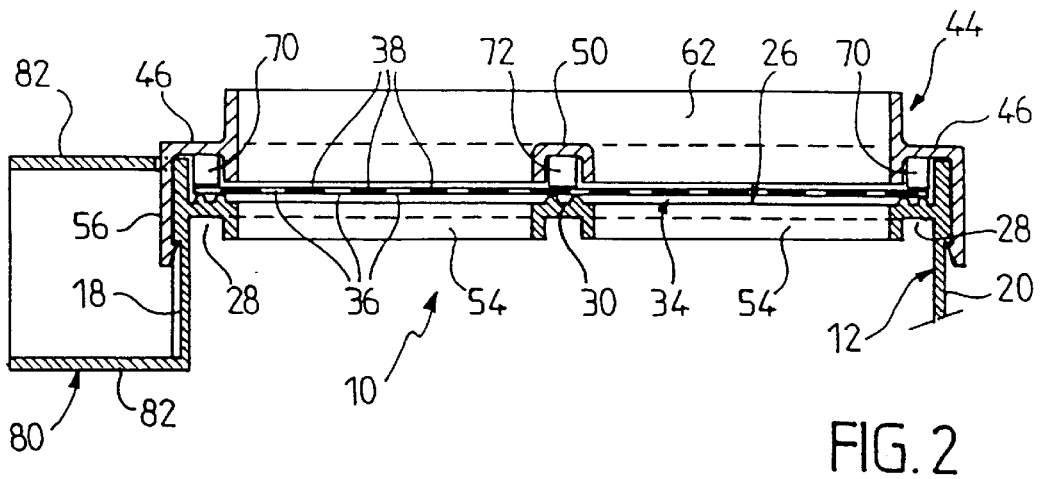
FIG. 2 is a view in cross section taken on the line II—II in FIG. 1.

The press frame 44 is provided with two pairs of clipping lugs 56, each of which is joined to a corresponding longitudinal side portion 46 of the press frame 44, extending at right angles to the longitudinal edge 46 as can be seen in FIGS. 1 and 2. Each clipping lug 56 has a retaining bead 58, and the lugs 56 are arranged to be engaged in appropriately formed recesses 60 formed along the side plates 18 and 20 of the support frame 12. In addition, the press frame 44 has a connecting skirt portion 62 projecting away from the plane of the side portions 46 and 48 on the side of the frame 44 that faces away from the film 34. The connecting skirt 62 enables the air flow control module 10 to be fitted to an air passage aperture as will be seen later herein. Each of the peripheral flanges 54 has a rounded free edge 64 (FIG. 3), so as to avoid damage to the film 34 by the flange 54. In addition, the press frame 44 is joined to cover plates 66 which overlie the rollers 14 and 16 respectively, and which have rounded edges 68, shown in FIG. 3, again to avoid damage to the film blind 34.

The air flow control module also includes three leaf springs, namely a pair of side leaf springs 70 and a central leaf spring 72. These leaf springs are arranged parallel to each other, and are oriented in a direction at right angles to the axes A—A and B—B of the rollers, that is to say they extend in the direction in which the film blind 34 is displaceable by the rollers. The springs 70 and 72 are identical to each other and are made of a suitable springy metal. In this example, each spring 70 or 74 comprises a central portion 72 which is secured to the press frame 44 by means of rivets 76, together with two curved portions 78 on either side of the central portion 74. Each of the side leaf springs 70 is fitted under a respective one of the longitudinal side portions 46 of the press frame 44, in the region lying between the adjacent peripheral flange 54 and the adjacent pair of clipping lugs 56. The central leaf spring 72 is fitted under the central bridge 50, between the two peripheral flanges 54.

It should be noted that the curved portions 78 of the leaf springs are intersected by the plane containing the rounded free edges 64 of the flanges 54, as can clearly be seen from FIG. 3. The curved portions 78 thus project inwardly, and are able to bear on the film blind 34. In this way, the latter is held in engagement on its two side edges and on a central portion, which ensures good mechanical strength, despite the presence of the holes 36 in the film of the blind.

As can be seen in FIG. 3, the curved portions 78 of the side leaf spring 70 are biassed towards the double ribs 42 on the longitudinal side portions 28 of the guide frame 26. The curved portions 78 of the central leaf spring 72 are biased towards the double rib 42 of the central bridge 32 of the guide frame 26.

The air flow control module also includes a casing 80 (see FIGS. 1 and 2), which is disposed along the support frame 12. The casing 80 comprises a base, which consists of the side plate 18 through which the axes of the rollers 14 and 16 pass, together with a side wall 82 which is joined to the base at right angles to the latter. The casing 80 contains a reversible drive mechanism for synchronizing the rotation of the rollers 14 and 16 on their axes A—A and B—B. This mechanism is indicated diagrammatically at 84 in FIG. 4, and may for example include a synchronizing shaft which carries; gear elements that mesh with respective corresponding gear elements, carried at the ends of the shafts which define the axes A—A and B—B of the rollers 14 and 16. The casing 80 is closed by a cover plate 86, FIG. 4, which protects the drive mechanism 84.

The air flow control module 10 further includes a drive unit 88, which comprises a motor with a reduction gear driven by the motor. The drive unit is secured to the support frame 12, FIG. 4, by being secured to two fastening lugs 90 and 92 shown in FIG. 1. These lugs 90 and 92 are joined to the side wall 82 of the casing 80. The drive unit 88 has an output or drive shaft, not shown, which is coupled to the shaft of the roller 16. The drive motor in the unit 88 is thereby enabled to move the film blind 34 longitudinally in either direction, so as to put it in various selected positions in which the open regions 36 and the closed regions 38 of the blind control the flow of a stream of air through the two openings 52 in the press frame 44.

Figure 4:
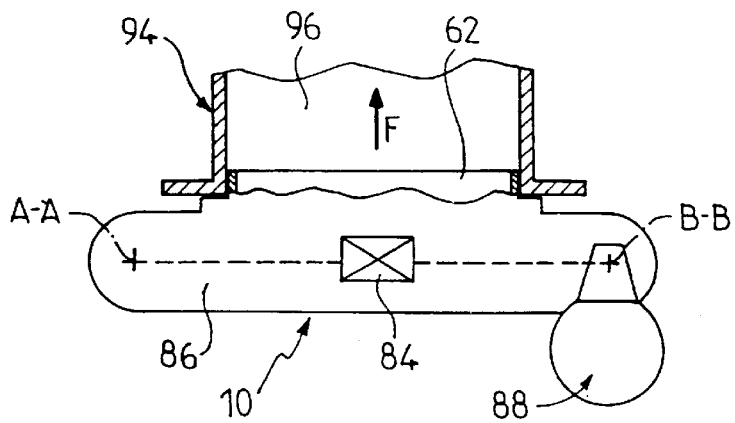
FIG. 4 is a view, partly in cross section, showing an air passage aperture equipped with an air flow control device in accordance with the invention.

As can be seen in FIG. 4, the skirt portion 62 of the press frame 44 enables the module 10 to be fitted to an air passage 94, which in this example is a duct that forms part of an installation for heating and/or air conditioning a motor vehicle. The duct defines an air passage aperture 96 at its open end. Thus the air flow control device 10 controls the flow of an air stream F in accordance with the position of the film blind 34.

The invention is of course not limited to the embodiment described above by way of example. Other versions can be conceived, especially as regards the structure of the support frame and/or that of the guide frame, the press frame and the spring means.

It should be noted that these spring means need not be of the leaf spring type, and that other types of resilient device may be used, for example springs carrying or engaged with rollers which are biased by the springs into contact with the film blind. In all cases, a relatively light force must be communicated to the spring means, so as to avoid excessive friction on the film.

Equally, the air flow control device may be used for controlling an air stream, or a plurality of air streams, flowing through one or more air passage apertures, the configuration, number and position of the holes 36 in the film being chosen accordingly.

The air flow control device of the invention is particularly suitable for equipping passenger vehicles such as motor cars, with or without air conditioning.

What is claimed is:

1. A flow control device for controlling the flow of a stream of air through an air passage aperture, the flow control device having a pair of rollers spaced apart from each other and a film wound on to the rollers to define an exposed portion of the film between the rollers, wherein the exposed portion of the film is disposed across the air passage aperture, the device further including means for driving the rollers so as to displace the film by winding the film on to one of the rollers and off of the other to move the exposed portion of the film transversely across said aperture, wherein the film comprises open regions and closed regions to control selectively the flow of air through the aperture according to the relative positions of the exposed portion of the film and the aperture, wherein the flow control device is an independent module comprising a support frame defining parallel axes, the rollers being mounted on the support frame for rotation about the axes, the support frame further including a guide frame in a location intermediate between the rollers for guiding the film and for contact with the film, and the device further including a press frame disposed in facing relationship with the guide frame, and at least one spring carried by the press frame for engagement with the film to press the film flat against the guide frame.

2. A flow control device according to claim 1, wherein the guide frame comprises a generally rectangular flat peripheral frame member having two longitudinal side portions extending at right angles to the axes, and two transverse side portions joining the longitudinal side portions together and extending parallel to the axes.

3. A flow control device according to claim 2, wherein each of the transverse side portions of the guide frame has an entry chamfer.

4. A flow control device according to claim 2, wherein the guide frame further includes a central bridge portion having ends joined to the transverse side portions of the guide frame.

5. A flow control device according to claim 2, wherein the guide frame is formed with ribs for supporting the film.

6. A flow control device according to claim 1, wherein the press frame and the guide frame are of homologous forms, the guide frame having two longitudinal side portions and two transverse side portions.

7. A flow control device according to claim 6, wherein the guide frame includes a central bridge portion having ends joined to the transverse side portions of the guide frame, the press frame further including a central bridge portion having ends joined to the transverse side portions of the press frame, the two said bridge portions being in facing relationship with each other.

8. A flow control device according to claim 1, wherein the at least one spring comprise at least two leaf springs carried by the press frame, with each leaf spring being oriented in a direction transverse to the axes.

9. A flow control device according to claim 8, having three leaf springs, wherein two springs re each oriented along a respective one of the longitudinal portions of the press frame, and a third spring being in facing relationship with a bridge portion of the guide frame.

10. A flow control device according to claim 8, wherein the leaf springs are of metal, the device further including rivets securing the leaf springs to the press frame.

11. A flow control device according to claim 1, wherein the press frame further includes clipping lugs for fastening the frame to the support frame.

12. A flow control device according to claim 1, wherein the press frame includes, on the side thereof facing away from the film, a connecting skirt for fitting the flow control device to the air passage aperture.

13. A flow control device for controlling the flow of a stream of air through an air passage aperture, comprising:

first and second rollers spaced apart from each other;

a film wound onto the first and second rollers to define an exposed portion of the film between the first and second rollers, the exposed portion of the film being disposed across the aperture and movable across the aperture by winding the film on one of the first and second rollers and off the other;

a guide frame for guiding the film;

a press frame disposed in facing relationship with the guide frame; and at least one spring, arranged on the press frame, to engage and press the film against the guide frame.

14. A flow control device according to claim 13, further comprising a support frame having arranged thereon the first and second rollers and the guide frame.

15. A flow control device for controlling the flow of a stream of air through an air passage aperture, comprising:

means for moving a portion of a film across the aperture, the portion being disposed across the aperture;

means for guiding the film;

a spring, adapted to engage the film, for exerting an elastic pressure on the film to urge the film against the means for guiding; and means, disposed in facing relationship with the means for guiding, for carrying said spring.

16. A flow control device for controlling the flow of a stream of air through an air passage aperture, comprising:

first and second rollers spaced apart from each other;

a film wound onto the first and second rollers to define an exposed portion of the film between the first and second rollers, the exposed portion of the film being disposed across the aperture and movable across the aperture by winding the film on one of the first and second rollers and off the other;

a guide frame for guiding the film; and a spring, adapted to engage the film, to exert an elastic pressure on the film to urge the film against the guide frame.

* * * * *